US008274466B2

United States Patent
David et al.

(10) Patent No.: US 8,274,466 B2
(45) Date of Patent: Sep. 25, 2012

(54) SYSTEM AND METHOD FOR PROVIDING BIAS VOLTAGES TO PAD LOGIC OF AN LCD CONTROLLER

(75) Inventors: Thomas S. David, Austin, TX (US); Douglas Piasecki, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 850 days.

(21) Appl. No.: 12/397,616

(22) Filed: Mar. 4, 2009

(65) Prior Publication Data

US 2010/0225638 A1 Sep. 9, 2010

(51) Int. Cl.
*G09G 5/00* (2006.01)
*G09G 3/36* (2006.01)

(52) U.S. Cl. .......................................... 345/98; 345/214

(58) Field of Classification Search .................. 345/84, 345/87–104, 204, 211–214, 690; 323/318; 713/300
See application file for complete search history.

(56) References Cited

U.S. PATENT DOCUMENTS 7,317,627 B2 * 1/2008 Endo et al. ................. 363/147
2008/0259017 A1 * 10/2008 Wright et al. ................. 345/94

* cited by examiner

Primary Examiner — Joseph Haley
Assistant Examiner — Andrew Sasinowski (57) ABSTRACT

An LCD controller includes at least one I/O pad for providing an LCD drive voltage in an LCD mode of operation. I/O pad logic drives the at least one I/O pad responsive to a provided bias voltage. Voltage selection logic selects a higher voltage between an LCD drive voltage and an externally provided system voltage as a first voltage. Bias voltage logic selects one of the system voltage or the first voltage as the bias voltage for the I/O pad logic. The system voltage is selected as the bias voltage for the I/O pad logic in a non-LCD mode of operation for the I/O pad and the first voltage is selected for the bias voltage for the I/O pad logic in the LCD mode of operation for the I/O pad.

20 Claims, 10 Drawing Sheets

SYSTEM AND METHOD FOR PROVIDING BIAS VOLTAGES TO PAD LOGIC OF AN LCD CONTROLLER

CROSS-REFERENCE TO RELATED APPLICATIONS n/a

TECHNICAL FIELD

The present invention relates to LCD controllers, and more particularly, to a method for providing bias voltages to output pad logic of an LCD controller.

BACKGROUND

Electronic design often requires the use of various interface circuitries such as liquid crystal displays (LCDs) and capacitive sensor arrays that enable the user to interact with or receive information from an electronic circuit. Typically, LCD displays are driven by dedicated LCD controllers which enable a circuit to control an LCD display to display desired information on the segments of the LCD display. Similarly, dedicated sensing circuitry may be used to detect the activation of capacitive switches within a capacitive sensor array enabling a user to input particular information to a circuit.

In control devices wherein the output pins may be configured to perform either of the functionalities of driving an LCD display or enabling sensing of signals from a capacitive sensor array, there is the possibility of both digital and/or analog signals being provided to the input/output pins. The voltage operating ranges of the input/output pins may vary depending upon whether analog or digital signals are being utilized and based upon the type of analog or digital signal that is being applied to the pin. Should these voltages applied to the input pins exceed bias voltages that are applied to various circuitries and transistors within the LCD controller various circuit malfunctions or glitches may occur. Thus, there is a need to ensure that a situation does not arise wherein voltages applied to I/O pads of LCD controller circuitries do not exceed the bias voltages applied to various circuitries and transistors for operating the I/O pads of the LCD controller.

SUMMARY

The present invention, as disclosed and described herein, in one aspect thereof, comprises an LCD controller including at least one I/O pad for driving an LCD drive voltage in an LCD mode of operation for the I/O pad. I/O pad drive logic drives the at least one I/O pad responsive to a provided bias voltage. Voltage selection logic selects a higher voltage between an LCD drive voltage and an externally provided system voltage as a first voltage. Bias voltage logic selects the externally provided system voltage as the bias voltage of the I/O pad drive logic if the I/O pad of the LCD controller is in a non-LCD mode of operation. The bias voltage logic selects the selected higher voltage as the bias voltage of the I/O pad drive logic if the I/O pad at the LCD controller is in the LCD mode of operation.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a system and method for providing bias voltages to pad logic of LCD controller are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
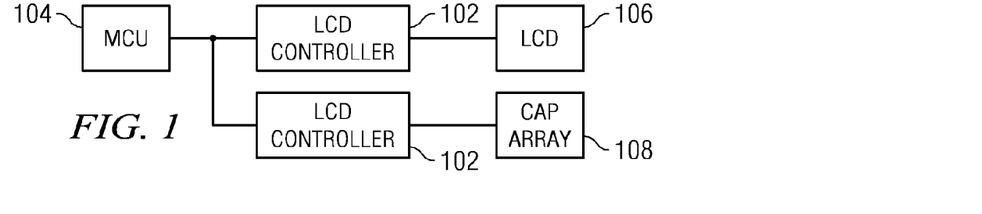
FIG. 1 is a functional block diagram illustrating the LCD controller slaved to a controller chip and controlling multiple liquid crystal displays.

Referring now to the drawings, and more particularly to FIG. 1, there is illustrated a functional block diagram of a plurality of LCD controller chips 102 that are connected as slave devices to a controlling microcontroller unit 104. The microcontroller 104 can comprise any number of microcontroller units having master control capabilities. The LCD controllers 102 may interface with the microcontroller unit 104 via a SPI interface, SMbus interface, or EMIF interface all in the slave mode. The LCD controllers 102 may be connected to an LCD display 106 or, alternatively, may be used with a capacitor switch array 108 using included capacitive sensor functionalities and LCD control functionalities that will be described herein below, or may be used as a GPIO expander.

As will be described herein below, the MCU 104 is operable to selectively control each of the LCD controllers 102. In general, each of the LCD controllers 102 is addressable via the interconnection therewith through a communication bus 110. This communication bus 110, as will be described herein below, can be a parallel communication bus or a serial communication bus. Each of the LCD controllers 102 is addressable such that data can be transferred to or from each LCD controller 102. These LCD controllers 102 can be enabled or disabled, placed into a low power mode, or into a full power mode. They can each be configured to operate in accordance with predetermined port configuration information. For example, the LCD controller 102 having the LCD 106 associated therewith is configured as such, although both LCD controllers 102 are identical. Once configured, the LCD controller 102 has data transmitted thereto from the MCU 104 for storage therein which is then used to drive the LCD 106 in the appropriate manner. Generally, when information is sensed from the capacitor array 108 by the LCD controller in a scanning operation, as will be described herein below, an interrupt will be provided, which interrupt is passed back to the MCU 104 through the bus 110 (the bus 110 includes address, control and data information). Thus, the LCD controller 102 operates independent of the MCU 104 during the scanning operation of the capacitor array 108. Once the capacitor array 108 has sensed a touch or a depression of a button, the LCD controller 102 will receive an indication of such, i.e., a "hit," and an interrupt will be generated. Once the interrupt is generated, the MCU 104 then accesses a register in the LCD controller 102 for the purpose of determining which area was touched on the capacitor array 108.

As will also be described herein below, each of the LCD controllers 102 can be placed into a low power mode where all the power is removed internally except for essential parts thereof. For example, the LCD controller 102 associated with the capacitor array 108 could be placed into a low power mode where the capacitor array was merely scanned. The remainder of the chip can be turned off until an interrupt is generated. Once the interrupt is generated, the LCD controller 102 will be powered back up, i.e., enabled, by the MCU 104 after it receives the interrupt. At this time, the LCD controller 102 will receive program instructions from the MCU 104 to reconfigure the LCD controller 102 in such a manner so as to clear all registers therein and reconfigure the device. This is done for the reason that the LCD controller 102 has no memory associated therewith.

Figure 2:
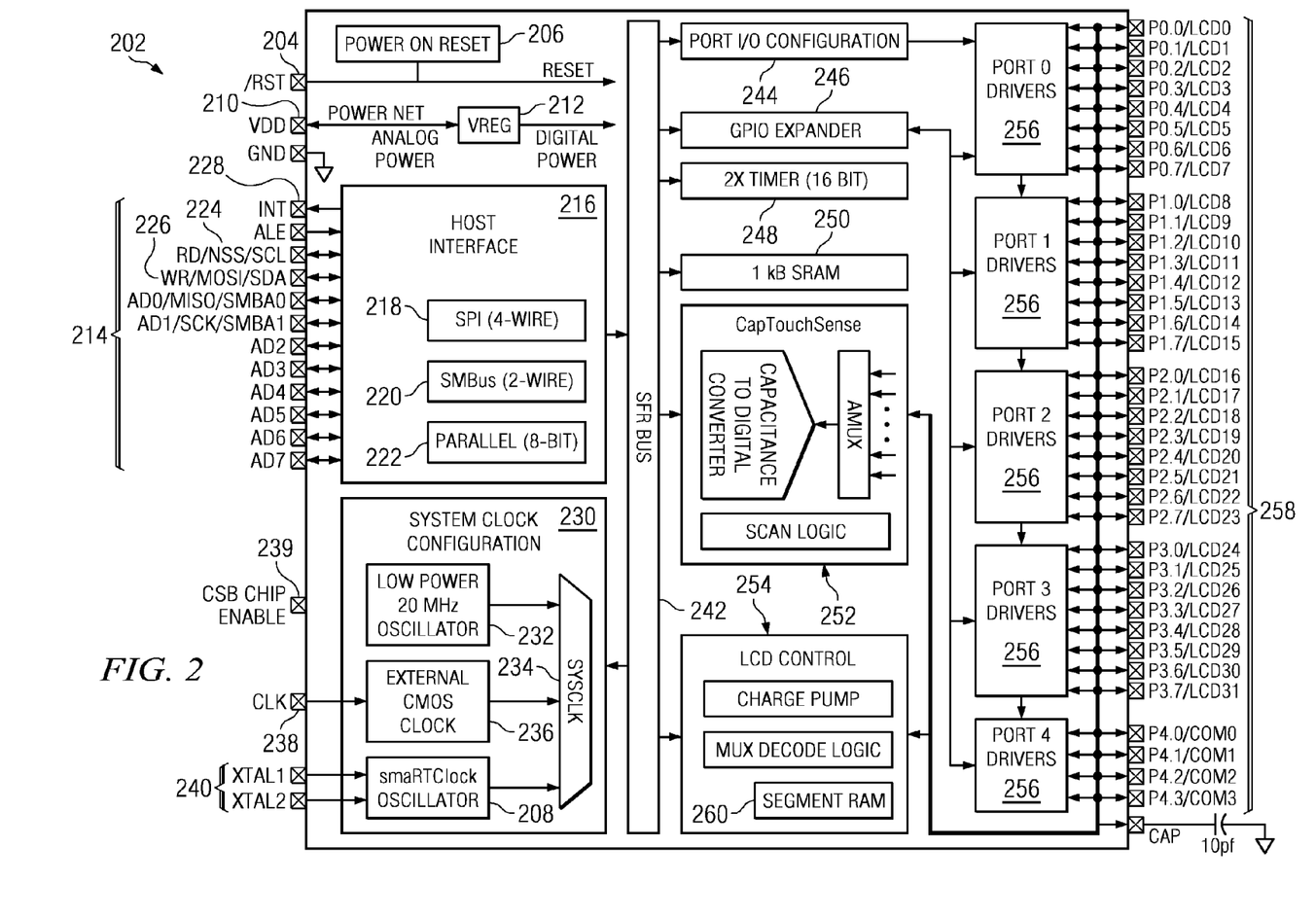
FIG. 2 is a block diagram of the LCD controller chip.

Referring now to FIG. 2, there is illustrated a block diagram of the LCD controller 202. The LCD controller 202 has two main reset sources. These include the RST PIN 204 and the power on reset block 206. The power on reset signal is generated by the power on reset block 206 when the LDO (low dropout regulator) 212 turns on. In low power mode, when the LDO 212 is enabled, a power on reset signal is generated which will reset all of the logic except for the real time clock 208 and the LCD power control block (not shown). These blocks can only be reset via the RST PIN 204 when the LCD low power enable bit is turned off. After this, the real time clock 208 can be reset via either source, although the LCD low power block can still only be reset via the RST PIN 204. System power is provided via a $V_{DD}$ pin 210 to a voltage regulator block 212. The system power applied to $V_{DD}$ pin 210 is used to provide external power to the system through an associated power net and the voltage regulator 212 provides regulated voltage to provide regulated power throughout the LCD controller 202. The power at $V_{DD}$ pin 210 is the raw unregulated power that is used to power the analog circuitry and provide power in low power mode. Basically, this is considered to be $V_{BAT}$ for the battery voltage. It is basically just the external voltage. Note that the regulated power can be disabled in low power mode.

The LCD controller 202 is a slave to an external MCU through a plurality of interface pins 214 connected with the host interface functions 216. The host interface 216 supports a four wire SPI interface 218, a two wire SMBus interface 220 and an eight bit parallel EMIF interface 222, all in a slave mode of operation only. The EMIF interface is described in U.S. patent application Ser. No. 10/880,921, filed Jun. 30, 2004, publication No. 2006/0002210, entitled "ETHERNET CONTROLLER WITH EXCESS ON-BOARD FLASH FOR MICROCONTROLLERS," which is incorporated herein by reference in its entirety. The EMIF interface 222 only supports multiplexed access and intel mode. The bus type supported by the host interface 216 is selected via the RST pin 204. A default mode for the LCD controller 202 is the SPI mode, providing for a serial data communication mode of operation. When the LCD controller 202 is held in reset via the RST pin 204 while the RD (read) pin 224 and the WR (write) pin 226 are each held high, the LCD controller 202 will power up in the EMIF mode controlled by the parallel eight bit interface 222. If, while the part is in reset, the RD pin 224 is held high or low while the WR pin 226 is held low, the controller 202 will power up in the SPI mode controlled by SPI interface 218. Finally, if while the LCD controller 202 is held in reset, the WR pin 226 is held high while the RD pin 224 is held low, the controller 202 will power up in the SMbus mode controlled by the SMBus interface 220.

The INT pin 228 is used to indicate the interface mode upon leaving reset mode. Upon exiting the reset mode, the INT (interrupt) pin 228 will be toggled with a frequency of the system clock divided by 2 to indicate that the EMIF bus has been selected. The INT pin 228 will toggle with the frequency of the system clock divided by 8 to indicate that the SPI mode has been selected, and the interrupt pin 228 will be toggled with the frequency of the system clock divided by 32 to indicate the SMBus mode selection. This toggling will go on for 256 system clock cycles after which the INT pin 228 will revert to functioning as the interrupt pin.

As noted herein above, each of the LCD controllers 202 is addressable. When the EMIF interface is utilized, i.e., a parallel address and parallel data is input to the system through this interface, the chip enable pin 239 is utilized, this being the CSB pin. Thus, there will be provided a separate line for each LCD controller 202 from the MCU 104. By enabling the particular chip, the data and address information can be sent thereto such that data can be written to a specifically addressed SFR or read therefrom. As noted herein above, each LCD controller 202 is substantially identical such that the address space for each SFR is the same for each LCD controller 202. As such, there must be some way to distinguish between the two parts. With respect to the serial data bus protocols, the chip enable pin is not required, as each of these two protocols has the ability to address a specific chip. Again, this is part of the protocol. Thus, all that is required to address a particular chip and write data thereto or read data therefrom is a communication path and a particular data communication protocol and an appropriate way to select a particular chip. Further, each of these chips will have a separate interrupt pin that will allow an interrupt to be sent back to the MCU 104. There will, of course, have to be provided one interrupt line for each LCD controller 202 such that the particular LCD controller can be distinguished. What will happen then is that the MCU 104 will take the appropriate action which will typically require the chip to be enabled and, after enabling, download the appropriate configuration information thereto, this assuming that the LCD controller 202 which generated the interrupt were in the low power mode of operation.

The system clock configuration block 230 enables the provision of a system clock signal from up to six clock sources. The low power 20 MHz oscillator 232 may provide a 20 MHz clock signal or alternatively may be divided by 2, 4 or 8 to provide a divided down 20 MHz clock signal to a multiplexer 234 for selection as the system clock. Additionally, external CMOS clock circuitry 236 may be used to provide the clock signal to the multiplexer 234 responsive to an external clock received via a clock pin 238. Finally, a real time clock oscillator 208 may be used to provide a system clock signal to the multiplexer 234. The real time clock is configured via a pair of external pins 240.

The LCD controller 202 boots up running the 20 MHz oscillator 232 in a divide by 4 mode. The LCD controller 202 may then be configured to any of the other clock sources. The internal oscillator can be controlled, i.e., turned on and off, either using an internal control register while running off the CMOS clock or by using an external control mode while toggling a pin (in this case the CMOS_clock pin 238) to turn the internal oscillator on and off. The system clock configuration block 230 and associated clock circuitry therein are described in co pending U.S. application Ser. No. 11/967,389 entitled "Power Supply Voltage Monitor" which is incorporated herein by reference. The system clock configuration 230 with the control register includes a control register bit which may be used to enable a sleep mode of the system clock. When this register bit is set, the clock pin 238 may be used to enable and disable the internal low power oscillator 232 without removing power from the remainder of the controller circuitry. This would comprise a sleep mode wherein the circuitry of the controller 202 remains under system power, i.e., connected to $V_{BAT}$ or $V_{EXT}$ on $V_{DD}$ pin, but no clock signal is provided from the oscillator 232. The real time clock oscillator 208 is unable to be trimmed. The real time clock oscillator 208 requires a 32 KHz oscillator and runs on the $V_{BAT}$ voltage domain, external power. The RTC 208 provides the LCD clock source for the LCD controller 202 both in high and low power modes since it is powered from external power and will not lose power when the LDO 212 is powered down. The RTC clock 208 may be reset by the RST pin 204 only when in low power operation. When in high power mode, the RTC clock 208 might be reset by either the reset pin 204 or the power on reset 206.

The chip enable pin 239 enables the controller 202 to be operated in two different modes. The chip enable pin 239 may be used as a chip select bit and, when in the EMIF communication mode with the external master controller. In a second mode of operation, when a particular bit within an associated SFR register is set, the chip select bit 239 may be used to enable and disable the voltage regulator 212 within the controller 202 without removing power to the rest of the circuitry running on $V_{BAT}$ within the controller 202. In this mode of operation, a bit is set internally that will designate the chip select bit as being an enable/disable pin for the LDO. In this mode of operation, the MCU 104 can generate through a dedicated line to a particular LCD controller 202 a signal that will cause the system to go into a low power mode. In this mode, what will happen is that the LDO will be powered down. This will result in the loss of power to a large block of circuitry, including registers and such. However, there will be a certain portion of the circuitry, such as certain portions of the LCD drivers or capacitive scanning circuitry that will be enabled. The RTC clock will also remain powered, since it is not driven from the output of the LDO 212. In this mode of operation, there will be certain registers that draw little power, but can be powered from the external power which is not regulated and may vary quite a bit. This particular circuitry, of course, is fabricated from high voltage circuitry whereas the circuitry associated with the output of the LDO 212 can have a regulated voltage and can be fabricated from much lower power (lower voltage) circuitry with thinner oxides and the such. When the system is re-enabled, what will happen is the LDO will be powered up and then a power on reset generated. In this power on reset, what will happen is that certain registers will be cleared, as they may have an unknown state, and then the configuration information is downloaded from the MCU 104 over the communication bus 110 to the LCD controller 202. The reason that this is required is because no flash memory is contained on-chip to the LCD controller 202. If memory were provided, this would not be necessary. However, that results in a much more expensive part and a different fabrication process. Since the MCU 104 has flash memory, it is only necessary to download the information thereto. As noted herein above, one event that can cause the MCU 104 to re-enable the part is the generation of an interrupt by the part. This interrupt indicates the presence of a touch on the capacitive sense array or the change of a value on a GPIO pin or any other pin with the port match feature. The re-enable is necessary in order to service the interrupt. However, during operation where the system is waiting for some change in the capacitive sense array or waiting for some change in data on a port, the part is placed in a low power mode of operation.

Components within the LCD controller 202 communicate via an SFR bus 242. The SFR bus 242 enables connections with a number of components including port I/O configuration circuitry 244, GPIO expander 246, timers 248, SRAM 250, capacitive touch sense circuitry 252 and the LCD control block 254. The port I/O configuration circuit 244 enables control of the port drivers 256 controlling a plurality of general purpose input/output (GPIO) pins 258 to configure the ports as digital I/O ports or analog ports. These GPIO pins 258 may be connected with a liquid crystal display controlled via the LCD control block 254, or alternatively, could be connected with a capacitive sensing array controlled via the cap touch sense circuitry 252. Further, they could be configured to be a digital input or output to allow the MCU 104 to expand its own internal GPIO capabilities.

The GPIO expander 246 offers a connection to 36 GPIO pins 258 for general purpose usage. The GPIO expander 246 allows the MCU 104, which itself has a plurality of pins which can be dedicated to digital input/output functions, to expand the number of pins available thereto. By addressing a particular LCD controller 202 and downloading information thereto while that LCD controller 202 is configured as a GPIO expander, data can be written to or read from any set of the GPIO pins on that LCD controller 202. This basically connects those pins through the port drivers to the SFR bus of the MCU 104.

The GPIO pins 258 can also be used for port match purposes. In the port match mode, each port can be treated as a match target with individual match selects for each pin. The port match process is a process wherein an internal register has a bit associated with a particular input/output pad. This pad will have associated therewith a digital I/O circuit which allows data to be received from an external pin or transmitted to an external pin. When configured as a digital I/O pin, this feature is enabled. However, each pin can also be configured to receive analog data or transmit analog data such that it is an analog pin. When so configured, the digital I/O circuitry is disabled or "tri-stated." The port match feature has digital comparator circuitry external to the pad provided which basically compares the current state of the associated pin with a known bit, this being a bit that is on the pin of the time of setting. When the data changes, this will indicate a change in the state which will generate an interrupt and will load information in a particular register such that this internal register or SFR can be downloaded and scanned to determine which port incurred a change. Of course, the MCU 104 also can just read the port pin itself. What this allows is one pin to be "toggled" to allow a signal to be sent external to the chip (LCD controller 202) to the MCU 104 indicating that new data has arrived. This is a way of clocking data through.

If an ultra low power port match mechanism is desired, the LCD controller 202 can be switched into ultra low power mode and the same register used for the ultra low power mode LCD data can be utilized to save match values. In this mode, the port match is forced to either match on all negative going signals or all positive going signals based on a bit in a configuration register. A port match will cause the generation of an interrupt via interrupt pin 228 which will cause the master controller MCU 104 to have to turn on the LDO 212 by pulling the CS pin low and, after detecting an interrupt, begin communicating with the LCD controller 202.

The timers 248 comprise generic 16 bit timers. Upon overflowing, the timers 248 will generate an interrupt via interrupt pin 228 to the master controller. The timer circuit 248 comprises two 16 bit general purpose timers. One timer is normally used for the SMBus time-out detection within the controller 202. The other timer is used as the capacitive sense time-out timer for the capacitive touch sense circuitry 252. The 1 kB SRAM 250 is offered for general purpose usage and can be read from and written to via any of the three host interfaces 216. The RAM 250 can be unpowered if desired via a configuration bit. Thus in applications that do not require extra SRAM, power can be saved by powering down the RAM. Note that this RAM 250 will lose its contents when the LDO is shut off.

The cap touch circuitry 252 implements a capacitive touch capability up to a maximum of 128 possible sensing locations. This large number of touch sense pins is supported via an array sensing capability. The cap touch sense circuitry 252 includes three operating modes, the linear auto scan mode, the row/column auto scan mode and the 4×4 scan with LCD mode. Each capacitive pin detection takes approximately 32 microseconds. Thus, sensing 128 possible touch sense locations will take approximately 4.6 milliseconds which is well within any human interface appliance timing requirements. As noted herein above, whenever the system is configured for scanning, the system can operate in a low power mode or in a high power mode. In a low power mode, the system basically waits for some indication that a particular pad has been touched and then generates an interrupt. As will be described herein below, this basically utilizes the analog aspect of each of the pads, i.e., the analog value on each of the pads is sensed.

Figure 3A:
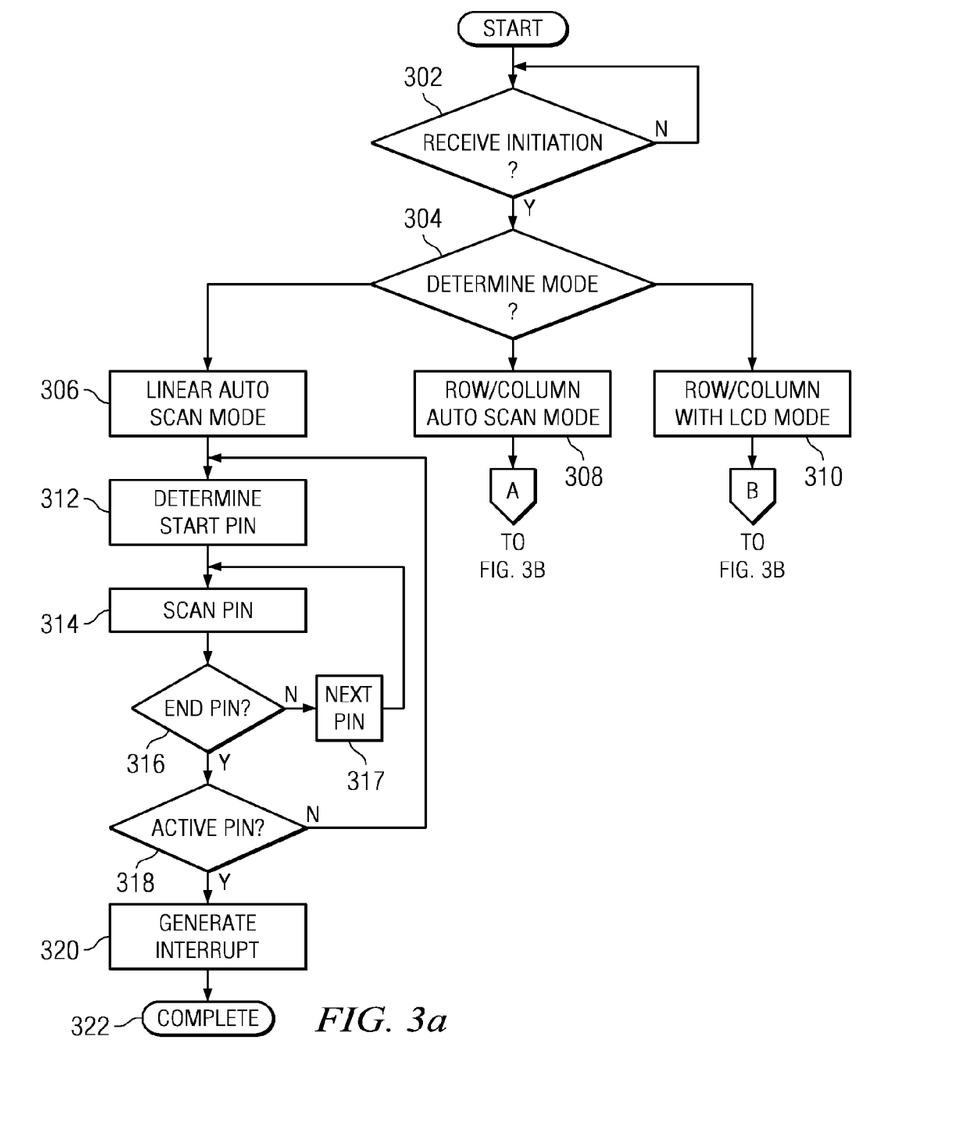
FIGS. 3a-b are flow diagrams illustrating the operation of the capacitive touch sensor block of the LCD controller.
Figure 3B:
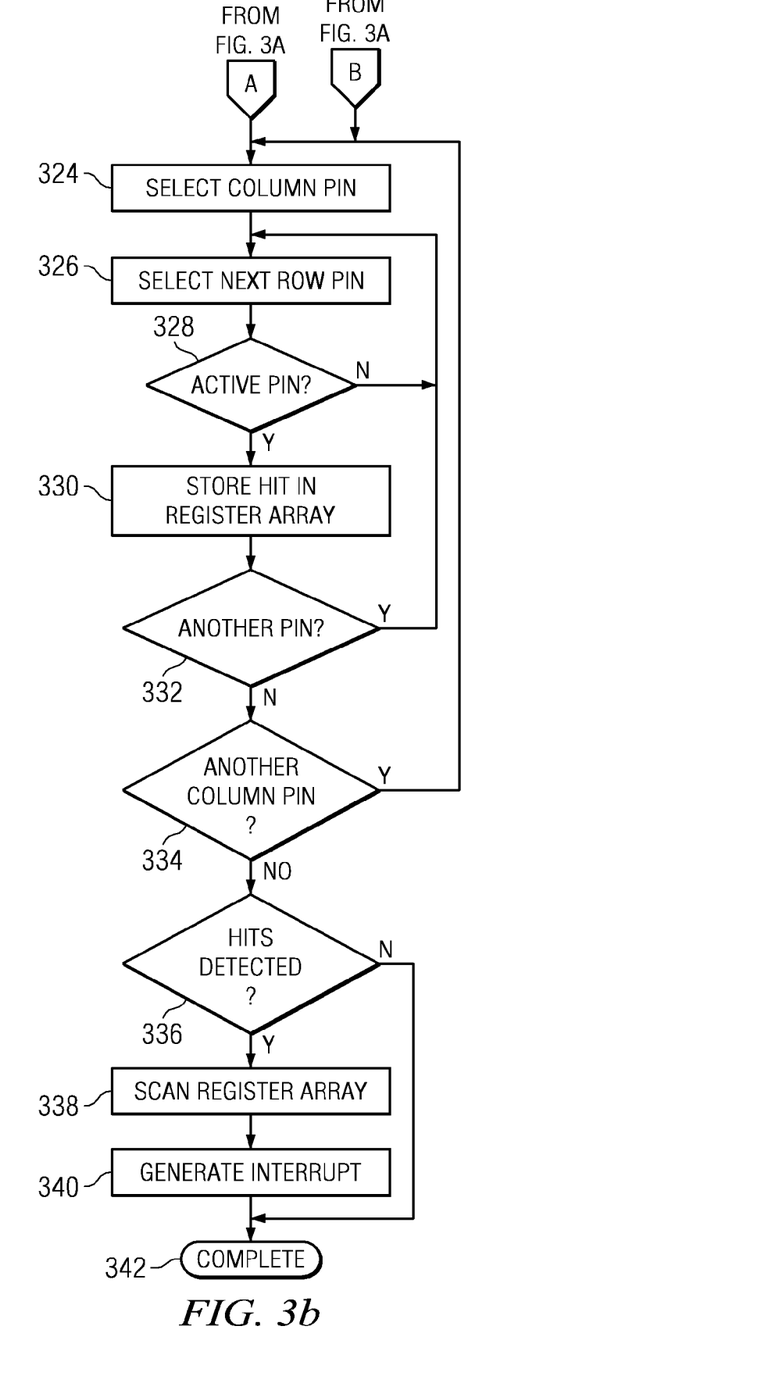

Referring now to FIG. 3*a* and 3*b*, there is illustrated a flow diagram describing the operation of the various modes of the capacitive sense touch circuitry 252. The various scan modes can be initiated either via a timer overflow, a user generated "start signal," or an auto start mode wherein, upon completion of every pin conversion, the logic will switch to the next pin and begin another conversion. Once this initiation has been determined to be received at inquiry step 302, inquiry step 304 determines the particular mode of operation of the capacitive touch sense functionality 252. The capacitive touch sense circuitry 252 may operate in the linear auto scan mode 306, the row/column auto scan mode 308 or the row/column with LCD mode 310.

The linear auto scan mode 306 scans pins between a specified start point and end point continuously. Every time an end point is hit, an interrupt is generated if any of the pins detected a touch. Otherwise, the process begins scanning from the start pin again. In the row/column auto scan mode 308, rows and columns are scanned via a touch sense array structure. Up to 4 pins are reserved as "column pins" and any number up to a maximum of 32 pins can be reserved as "row pins." Each of the 32 rows is cycled through once for each column, thus generating a maximum of 32×4 possible hits. The row/column results are stored in an 8×16 register array with one bit representing each pin. At the end of the entire row/column scan an interrupt is generated only if a hit was detected, at which time the master controller can scan the row/column register array and determine which pins where actuated. In the row/column with LCD mode 310, four pins are reserved as column pins and up to a maximum of 4 pins can be treated as row pins giving a maximum of 16 possible touch sense points. The remaining pins are used to drive an LCD. This mode operates similar to the row/column mode except for the limitations on the number of pins dedicated to the cap sense functionality.

If the linear auto scan mode is selected, the mode is initiated at step 306 and the start pin to be scanned is determined at step 312. The determined start pin is scanned at step 314 and inquiry step 316 determines if this is the final pin according to the linear scan mode. If not, control passes to step 317 to move to a next pin, and the next pin is scanned at step 314. This process continues until the end pin is reached at inquiry step 316, and inquiry step 318 determines if one of the sense pins has been activated. If not, control passes back to step 312. The start pin is determined and scanning from the start pin to the end pin is again initiated. If one of the sense pins has been activated, an interrupt is generated at step 320. The process is completed at step 322 or control may pass back to step 312 to begin scanning at the start pin once again.

If inquiry step 304 determines that the device is in the row/column auto scan mode 308, a column pin is initially selected at step 324. A row pin associated with the column is selected at step 326. Inquiry step 328 determines whether the selected row pin is active or not. If not, control passes back to step 326 to select a next row pin. If the selected pin is active, control passes to step 350 wherein an indication of the hit related to the active pin is stored within the associated register array. Inquiry step 332 determines whether there is another pin within the row group of pins and if so, control passes back to step 326. If no further row pins exist, inquiry step 334 determines whether another column pin exists. If so, control passes to step 324 to select the column pin and scanning of each of the row pins within the column is carried out as described previously. If no additional column pins exist, control passes to step 336 wherein a determination is made if any hits were detected by the row/column scan process. If not, the process is completed at step 342. If hits were detected, the register array is scanned at step 338 to determine all of the pins having associated hits and an interrupt is generated at step 340 to reflect the appropriate pins that were activated.

If inquiry step 304 determines that the capacitive touch sense functionality 252 is in the row/column with LCD mode 310, the procedure for processing these capacitive touch sense pins is the same as that described with respect to the row/column auto scan mode. The only difference is that each of the 4 columns are limited to 4 rows such that each group includes a 4×4 matrix.

Figure 4:
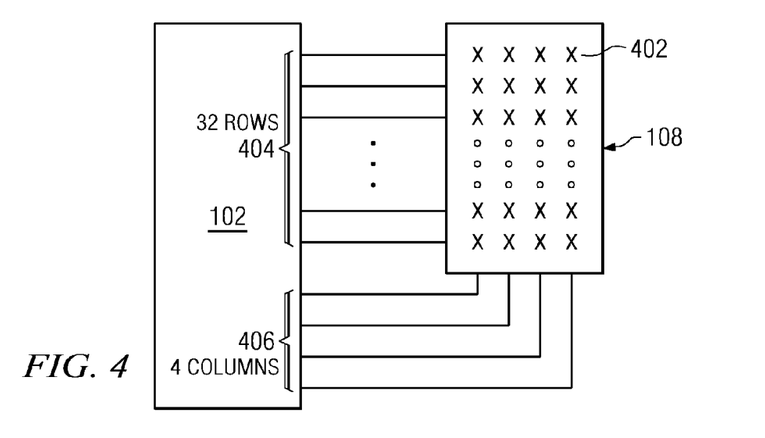
FIG. 4 illustrates an interconnection between the LCD controller and a capacitive sensor array.

Referring now to FIG. 4, there is illustrated the manner in which the LCD controller 102 interconnects with a capacitor array 108 through the capacitive touch sense circuitry 252. The capacitor array 108 can consist of up to a 32 row by 4 column array of capacitive switches 402 each represented in FIG. 4 by an X. The capacitive switches 402 each have a connection to one of the 32 row pins 404 and to one of the four column pins 406. Thus, each of the capacitive switches 402 are connected with the LCD controller 102 at the intersection of the row connection 404 and the column connection 406. The capacitive touch sense circuitry 252 interconnects with the row and column pins connected to the capacitor array 108 and generates an interrupt each time it is sensed that at least one of the capacitive switches 402 within the capacitor sensor array 108 has been touched.

The GPIO pins 258, as described herein above, can be configured to receive or output digital or analog signals depending on whether the pin is acting as a driver for an LCD display or is connected for sensing on a capacitive sensor array. The voltages applied to the GPIO pins 258 by the LCD driver circuitry can range anywhere from 2.6 volts to 3.6 volts. The internal bias voltage $V_{DD}$ external applied to the system will range from 1.8 volts to 3.6 volts. Thus, there is the possibility of a situation wherein the LCD driver voltage $V_{LCD}$ being applied to the GPIO pin 258 to drive an LCD segment exceeds the bias voltage $V_{DD}$ external being applied to the rails of the pad driver logic and analog multiplexer logic within the LCD controller that is driving the particular GPIO pin 258. This condition can cause transistors within the pad circuitry to inadvertently turn off at undesired times causing glitches in the operation of the LCD controller. Thus, the configuration described herein below with respect to the pad logic of the GPIO pins 258 is intended to ensure that the bias voltages applied to the analog multiplexer of the LCD controller and the pad driver logic of the LCD controller always remain equal to or higher than the LCD driver voltage being output on the GPIO pin.

Figure 5:
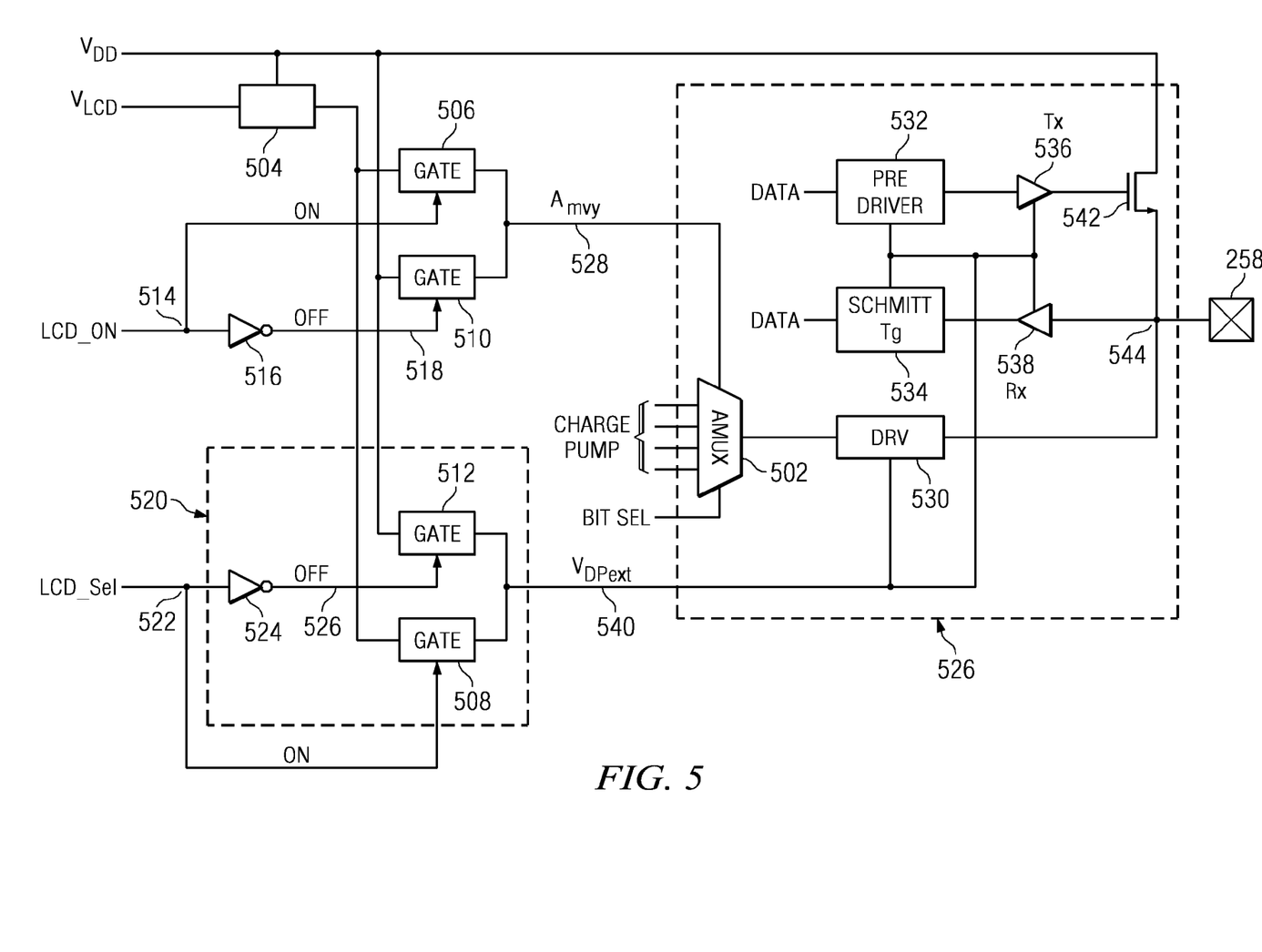
FIG. 5 is a block diagram illustrating the control logic for the GPIO pads of the LCD controller.

Referring now to FIG. 5, there is illustrated a general block diagram of the circuitry associated with the GPIO pin 258 in order to ensure that that the bias voltage applied to an analog multiplexer 502 and the pad driver logic always remain equal to or greater than the LCD driver voltage $V_{LCD}$ output on the GPIO pin 258. The external system voltage ($V_{DD}$) and the LCD driver voltage ($V_{LCD}$) are each applied to voltage selection logic 504. The voltage selection logic 504 is responsible for detecting the highest voltage between the $V_{DD}$ external voltage and the $V_{LCD}$ voltage and providing this highest voltage as the signal $V_{DD}/V_{LCD}$ to gate logic 506 and 508. Additionally, the external system voltage $V_{DD}$ is also directly applied to a second pair of gate logic consisting of gates 510 and 512. The gate logic circuits 506 through 512 are responsive to the control signals LCD_ON and LCD_SELECT for selecting the bias voltages to be applied to the analog multiplexer 502 and the various components of the pad driver logic.

The control signal LCD_ON provides a logical indication of whether the LCD driver functionality of the LCD controller is being utilized. When the LCD driver functionality is being utilized, drive voltages for provision to various GPIO pins 258 will be provided from the charge pump to the analog multiplexer 502. When this occurs, the control signal LCD_ON applied at node 514 closes gate logic 506 causing the signal $V_{DD}/V_{LCD}$ from the voltage selection logic 504 to be applied as the bias voltage to the analog multiplexer 502. The control signal LCD_ON would also go through the inverter 516 which is connected between node 514 and node 518 to the control input of gate logic 510. The signal that closes gate logic 506 would similarly cause the gate logic 510 to open thus preventing the $V_{DD}$ signal from being passed to the analog multiplexer 502 as the bias voltage.

When the LCD_ON signal is at a logical low level indicating that the LCD controller is not providing an LCD driver functionality, the control input to gate logic 506 opens this gate and closes gate logic 510. This causes the signal $V_{DD}$ to be provided to the analog multiplexer 502 as the bias voltage for the device. Thus, the bias voltages applied to the analog multiplexer 502 are assured to be at a highest available level when the analog multiplexer 502 is operating in the LCD driver mode ensuring that the voltages being multiplexed through the analog multiplexer 502 are not higher than the bias voltage being applied to the analog multiplexer 502. This prevents inadvertent glitches and errors in the operation of the LCD controller.

An additional control signal LCD_SELECT is used for determining whether a particular GPIO pin 258 is being used for driving a connected LCD segment. As described herein above, the LCD controller may operate in certain modes of operation to both drive an associated LCD and provide capacitive sensing capabilities. Thus, the situation exists where some GPIO pins 258 may be connected to LCD circuits while others would be connected with a capacitive sensor array. Thus, each GPIO pin 258 would have the associated control logic indicated generally at 520. The selection logic 520 is responsive to the LCD_SELECT signal.

The LCD_SELECT signal is applied at node 522 to the input of gate logic 508 and the input of an inverter 524. The output of inverter 524 is connected to the control input of gate logic 512 at node 527. When the LCD_SELECT signal applied at node 522 is at a logical high level indicating that the associated GPIO pin 258 is being used for driving, LCD gate logic 508 is closed while gate logic 512 is open. This causes the signal $V_{DD}/V_{LCD}$ to be provided as the bias voltage to various components of the pad driver logic 526. Similarly, when the LCD_SELECT signal indicates that the GPIO pin 258 is not driving an LCD, the gate 512 will be closed and the gate logic 508 will be opened causing the $V_{DD}$ signal to be provided as the bias voltage to the pad driver logic 526.

Thus, the bias voltage signal applied to the pad driver logic 526 will comprise the highest of the $V_{DD}$ and $V_{LCD}$ voltages when the GPIO pin 258 is being used to drive an associated LCD. This will ensure that the bias voltage is higher than any drive signal voltage being applied to the LCD through the GPIO pin 258 to prevent undesired circuit glitches. When not driving an LCD, the normal external voltage $V_{DD}$ may be applied as the bias voltage to the pad driver logic component 526. It should be noted that the selection logic 520 is repeated for each GPIO pin 258 within the LCD controller. However, the selection logic associated with the LCD_ON signal only occurs once within each LCD controller.

The pad driver logic 526 receives the analog multiplexer bias voltage via line 528. The pad selection logic receives the bias voltage for the driver logic 530, the pre-driver 532, Schmidt trigger 534, transceiver circuit 536 and receiver circuit 538 via line 540. The driver logic 530 is connected to the output of the analog multiplexer 502 to receive the LCD driver voltage provided from the charge pump. The output of the driver circuit 530 is connected to a source of a transistor 542, at node 544, connected to the GPIO pin 258. Data sent out over the GPIO pin 258 is provided to a pre-driver circuit 532 having its output connected to the transceiver 536. Transceiver 536 transmits the data through the gate of transistor 542 which has its drain/source path connected between $V_{DD}$ and node 544. Data received over the GPIO pin 258 is provided to the input of a receiver circuit 538. The output of the receiver circuit 538 provides the data to the input of a Schmidt trigger 534.

Figure 6:
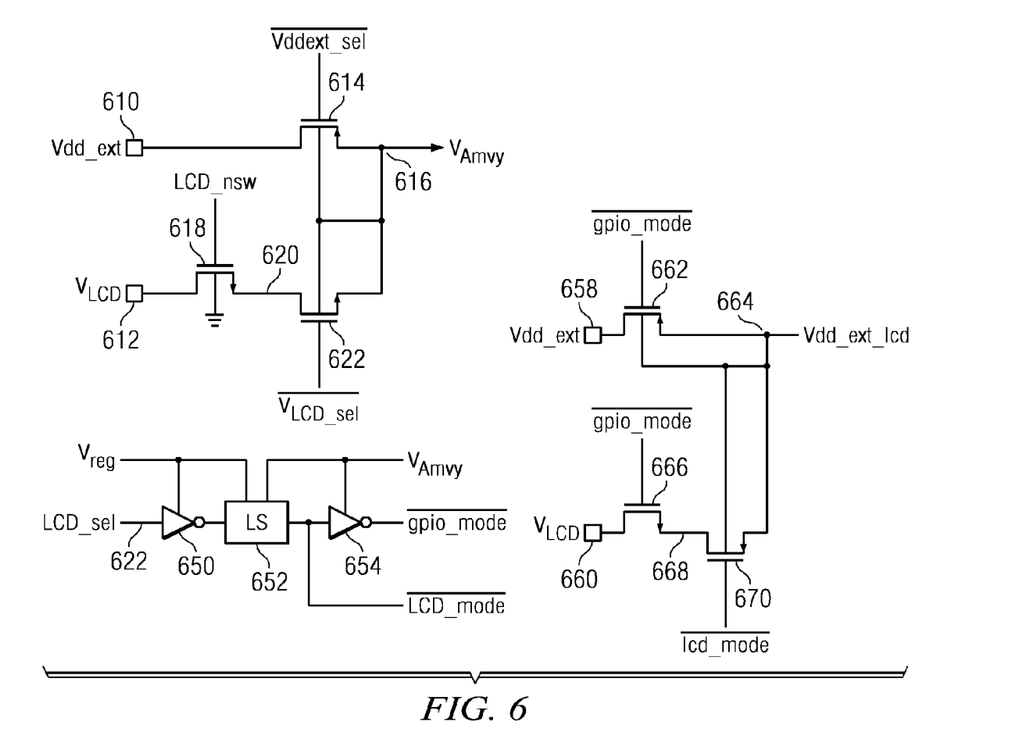
FIG. 6 is a schematic diagram of the multiplexer for selecting the bias voltages to apply to the analog multiplexer and the pad driver logic.

Referring now to FIG. 6, there is more fully illustrated the gate logic 506 through 512 that is used for selecting the particular bias voltage to apply to the analog multiplexer 502 and the pad driver logic 526, respectively. The external system power signal VDD_EXT is provided at an input node 610. The voltage $V_{LCD}$ is applied at node 612 from the voltage select logic which will be described more particularly with respect to FIG. 7.

The VDD_EXT signal at node 610 passes through a transistor 614 having its drain/source path connected between node 610 and node 616. Transistor 614 is turned on and off responsive to the $\overline{\text{VDDEXT\_SEL}}$ signal applied to the gate of transistor 614. Node 616 is the output node connected to the analog multiplexer 502. The $V_{LCD}$ voltage applied at node 612 passes through a transistor 618 having its drain/source path connected between node 612 and node 620. The gate of transistor 618 is connected to receive the control signal $\overline{\text{LCD\_NSW}}$. A transistor 622 has its drain/source path connected between node 620 and node 616. The gate of transistor 622 is connected to the signal $\overline{\text{VLCD\_SEL}}$. When the signal VLCD_SEL indicates that the LCD mode of the LCD controller is enabled, transistor 614 is turned off and transistor 618 and 622 are turned on to provide the $V_{LCD}$ voltage to the analog multiplexer via node 616. When the VLCD_SEL signal indicates that the LCD mode is not turned on, transistor 614 is turned on and transistors 618 and 622 are turned off such that the VDD_EXT voltage is applied to the analog multiplexer via node 610.

The control signal LCD_SEL is applied at node 622 to an inverter 650. The output of the inverter 650 is connected to a level shifter 652. A bias voltage $V_{REG}$ is applied to the inverter 650 and the level shifter 652. The output of the level shifter 652 is connected to the input of another inverter 654 at node 656. The output of inverter 654 provides a control signal $\overline{\text{GPIO\_MODE}}$ and a control signal $\overline{\text{LCD\_MODE}}$ is provided from node 656. The voltage VDD_EXT is applied at node 658 and the $V_{LCD}$ voltage is applied at node 660. The $V_{DD}$ voltage applied at node 658 passes through a transistor 662 to the output node to the pad driver logic at node 664. Transistor 662 has its drain/source path connected between node 658 and node 664 and receives at its gate a control signal $\overline{\text{GPIO\_MODE}}$ from the output of the inverter 654. The voltage $V_{LCD}$ is applied at node 660 through a transistor 666 having its drain/source path connected between nodes 660 and 668 and through a transistor 670 having its drain/source path connected between nodes 668 and 664. The gate of transistor 666 is connected to receive the control signal $\overline{\text{GPIO\_MODE}}$ from the inverter 654 and the transistor 670 receives the control signal $\overline{\text{LCD\_MODE}}$ at its gate from node 656. The bias voltages $V_{AMUX}$ of the level shifter 652 and 654 are also received from node 616.

When the LCD_SEL signal indicates that the GPIO pin is to act as a LCD segment driver, transistor 662 is turned off while transistors 666 and 670 are turned on to provide the voltage $V_{LCD}$ at node 664 to the pad driver logic. Likewise, when the LCD_SEL signal indicates that the GPIO pin is not to operate as an LCD driver, transistor 662 is turned on while transistors 668 and 670 are turned off. This provides the voltage $V_{DD}$ as the bias voltage to the pad driver logic at node 664.

Figure 7:
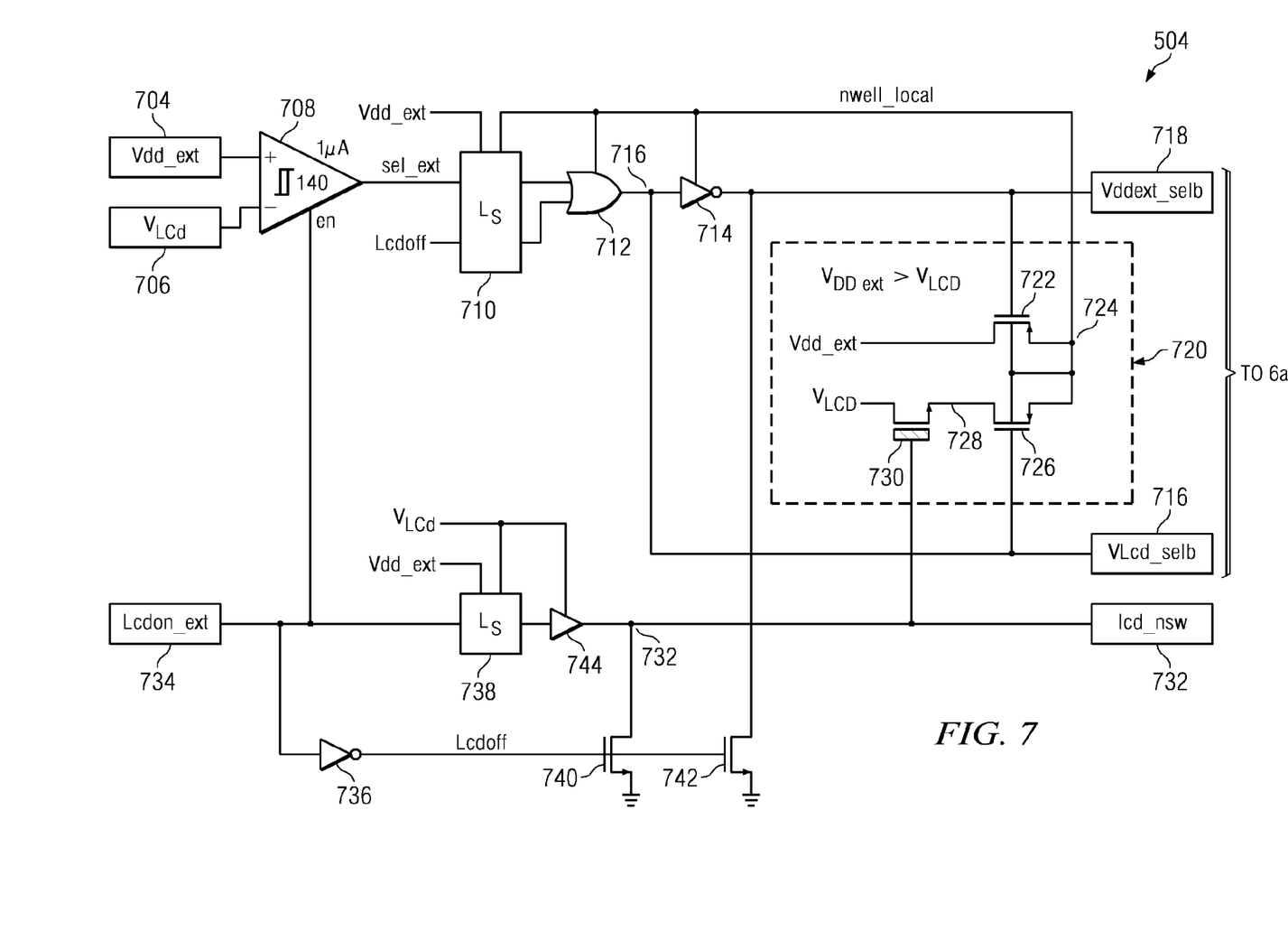
FIG. 7 is a schematic diagram of the circuitry for selecting the higher of the applied external system voltage $V_{DD}$ and the LCD driver voltage from a charge pump.

Referring now to FIG. 7, there is illustrated the voltage selection logic for determining the higher of the $V_{DD}$ or $V_{LCD}$ voltage and outputting this selected voltage. The voltage $V_{DD}$ is applied to the voltage selection logic 504 at node 704. The drive voltage $V_{LCD}$ is applied at node 706. The $V_{DD}$ voltage is applied from node 704 to the non-inverting input of a comparator 708. The drive voltage $V_{LCD}$ from node 706 is applied to the inverting input of a comparator 708. The comparator 708 determines which of the two voltages is greater and provides this as the SEL_EXT signal to a level shifter circuit 710. The level shifter 710 has two outputs connected to an OR gate 712. The output of the OR gate 712 is connected to the input of an inverter 714 at node 716. The output of the inverter 714 is provided as the $\overline{\text{VDDEXT\_SEL}}$ signal at node 718. Node 716 is connected to provide the $\overline{\text{VLCD\_SEL}}$ signal. The control signals at node 718 and node 716 provide the indications of which of the bias voltages $V_{DD}$ and $V_{LCD}$ are to be applied to the analog multiplexer through node 660.

An NSUB switch 720 consists of a transistor 722. The transistor 722 has its drain connected to receive the $V_{DD}$ bias voltage signal and its source connected to a node 724. The gate of transistor is connected to node 718. A second transistor 726 has its drain/source path connected between node 728 and node 724. The gate of transistor 726 is connected to node 716. Transistor 730 has its drain connected to receive the bias voltage $V_{LCD}$ and its source connected to node 728. The gate of transistor 730 is connected to node 732 which provides the LCD_NSW signal. An enable signal is provided at node 734 as the LCD ON_EXT signal. This enable signal is used for enabling the comparator 708 and is also connected to the input of an inverter 736 and a level shifter 738. The output of the converter 736 comprises the LCD OFF signal which is applied to the gates of a transistor 740 and 742. Transistor 740 has its drain/source path connected between node 732 and ground. Transistor 742 has its drain/source path connected between node 718 and ground. The level shifter 738 has its output connected to amplifier 746. The output of amplifier 746 is connected to node 732. The $V_{DD}$ and $V_{LCD}$ signals are also applied to level shifter 738 and the $V_{LCD}$ signal is applied to amplifier 744. When the $V_{DD}$ mode of operation is enabled, the $\overline{\text{VDDEXT\_SEL}}$ signal at node 718 is at a logical "high" level while the $\overline{\text{VLCD\_SEL}}$ signal at node 716 is at a logical "low" level. The LCD_NSW signal at node 732 will also be at a logical "low" level in this state. This will cause transistors 614 of FIG. 6 to be turned on and transistors 620 and 622 of FIG. 6 to be turned off providing the VDD_EXT signal as the multiplexer voltage VAMUX. When the LCD mode of operation is enabled, the voltage $V_{LCD}$ is provided as the analog multiplexer voltage at node 616 and the VLCD_SEL signal at node 716 and LCD_NSW at node 732 are each at a logical "high" level while the $\overline{\text{VDDEXT\_SEL}}$ signal at node 718 is at a logical "low" level. This turns on transistor 618 and 622 of FIG. 6 while turning off transistor 614. This causes the $V_{LCD}$ voltage to be provided at node 616.

Using the voltage selection logic 504 as described with respect to FIG. 7 and the gate logic 506 through 52 as described with respect to FIG. 6 ensures that when a particular GPIO pin 258 is operating as a driver for an associated LCD, that the bias voltage applied to the analog multiplexer 502 associated with the GPIO pin 258 and the pad driver logic 526 associated with the GPIO pin 258 will be provided a bias voltage that is greater than or equal to any driving voltages being applied from a charge pump through the analog multiplexer 502 to the LCD associated with the GPIO pin 258. This prevents the situation wherein the LCD driver voltage being applied through the GPIO pin 258 is higher than the bias voltages applied to one of the analog multiplexer 502 or the pad driver logic 526 resulting in circuit operational errors.

Figure 8:
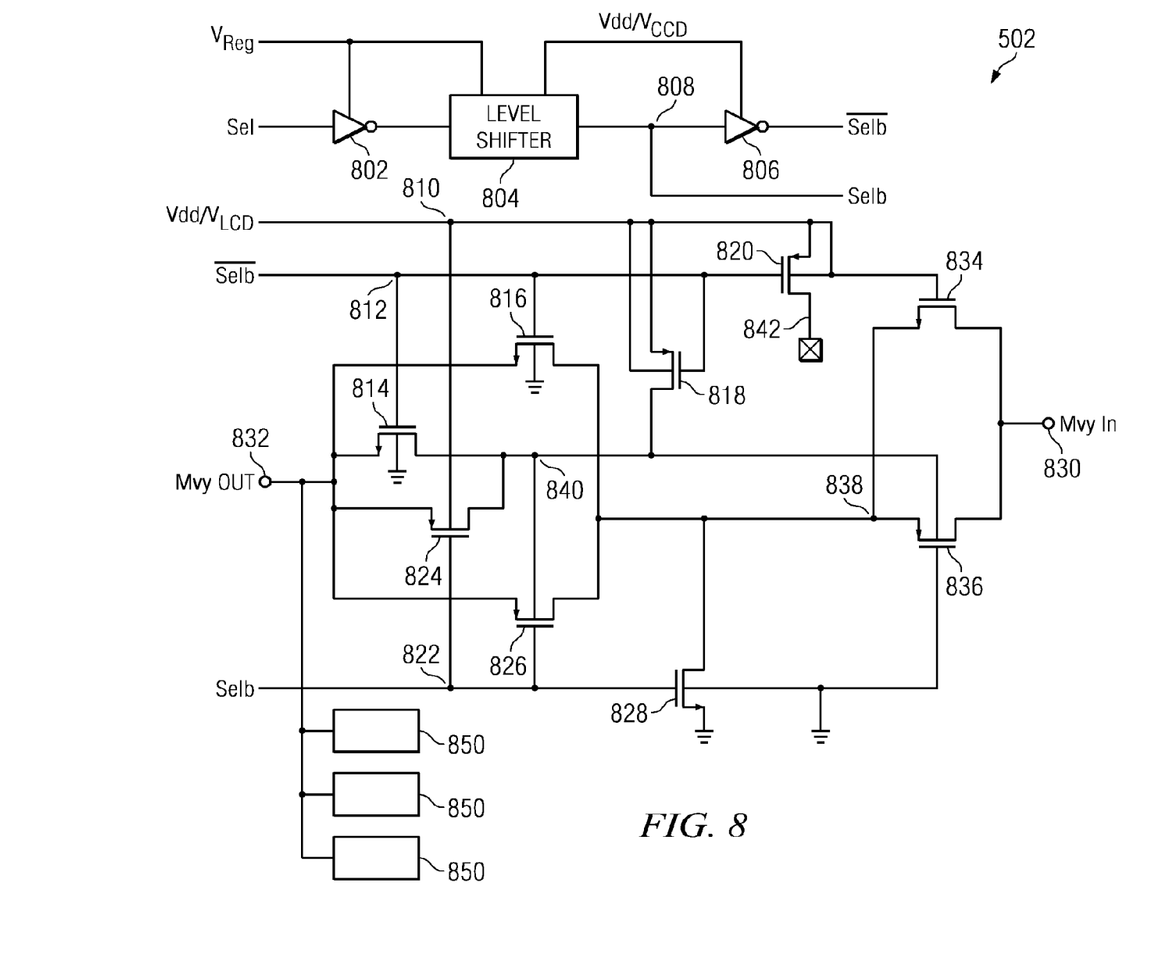
FIG. 8 is a schematic diagram of the analog multiplexer of the GPIO pad logic.

Referring now to FIG. 8, there is illustrated the schematic diagram for the analog multiplexer circuit 502 to which the bias voltage $V_{DD}/V_{LCD}$ or $V_{DD}$ is applied from the gate logic of FIG. 6. The control signal SEL is applied to the input of an inverter 802. The output of inverter 802 is connected to a level shifter 804. The regulated voltage $V_{REG}$ is applied to both of the inverter 802 and the level shifter 804. The output of the level shifter is connected to the input of another inverter 806 at node 808. The output of inverter 806 provides control signal $\overline{\text{SELB}}$ and the output of node 808 provides a control signal SELB. Within the analog multiplexer 502 the bias voltage $V_{DD}/V_{LCD}$ from the gate driver logic is applied at node 810. The control signal $\overline{\text{SELB}}$ is provided at node 812 to the gates of transistors 814, 816, 818 and 820, respectively. The SELB control signal is applied at node 822 to the gates of transistors 824, 826 and 828. A voltage signal is input to the multiplexer at node 830. While the illustration of FIG. 8 only illustrates a single input node and the circuitry associated therewith it would be understood that the analog multiplexer would include a number of inputs and the associated circuitry that were connected with a particular analog multiplexer output node 832.

The input multiplexed signal is provided at node 830 through transistors 834 and 836. Transistor 834 has its drain/source path connected between node 830 and 838. The gate of transistor 834 is connected to receive the bias voltage $V_{DD}/V_{LCD}$. The transistor 836 has its drain/source path connected between node 830 and node 838. The gate of transistor 836 is connected to ground. Transistor 828 has its drain/source path connected between node 838 and ground. The gate of transistor 828 is connected to receive the control signal SELB at node 822. Transistor 826 has its drain/source path connected between node 838 and the output node 832. The gate of transistor 826 is also connected to receive the control signal SELB at node 822. Transistor 824 has its drain/source path connected between node 840 and node 832. The gate of transistor 824 is connected to node 822 to receive the control signal SELB. Transistor 814 has its drain/source path connected between node 840 and node 832. The gate of transistor 814 is connected to node 812 to receive the control signal $\overline{SELB}$.

Transistor 816 has its drain/source path connected between node 838 and node 832. The gate of transistor 816 is connected to the node to receive control signal $\overline{SELB}$. Transistor 818 has its source/drain path connected between the bias voltage $V_{DD}/V_{LCD}$ at node 810 and node 840. The gate of transistor 818 is connected to node $\overline{SELB}$ at control node 812. Transistor 820 has its source/drain path connected between node 810 to receive the bias voltage $V_{DD}/V_{LCD}$ and node 842. The gate of transistor 820 receives the control signal $\overline{SELB}$. When the control signal SEL applied to inverter 802 indicates that the bit provided at the multiplexer input node 830 has been selected for output at the output of the multiplexer at node 832, the voltage applied at node 830 is passed through the circuitry of the analog multiplexer 502 to the output node 832.

The analog multiplexer circuit 502 described herein above is associated with each input pin of the analog multiplexer. Thus, three additional analog multiplexer circuits 850 would be connected with the multiplexer output node 832.

When the select input SEL indicates that a particular input has not been selected, (logical low) the output of the multiplexer circuit 850 connected with the multiplexer output node 832 is configured to float such that the output node 832 will be unaffected by any high voltage $V_{LCD}$ signal applied at the multiplexer input node 830 of one of the multiplexer circuits 850. Additionally, when the particular GPIO pin 258 is not being used for driving an LCD circuit, the analog multiplexer will be disabled. Thus, the select input SEL for each of the analog multiplexer circuits 850 will indicate that the associated analog multiplexer circuitry will be disabled causing the signal applied to the output node 832 to float from each of the circuits. This will also protect the output node 832 from any voltages applied at the input node 830 of any of the analog multiplexer circuits 850. When the SEL input indicates that the particular input pin 830 has been selected for output at the output node 832. The input voltage applied at the node 830 will pass through transistor 834 to node 838. The signal will then pass through transistor 816 to the output multiplexer node 832. When the particular input pin of the multiplexer is selected, transistors 824, 826, 828 and 836 are all turned "off" while transistors 814, 816, 818, 842 and 834 are all turned "on." The reverse is true when the select signal is at a logical low level.

Figure 9A:
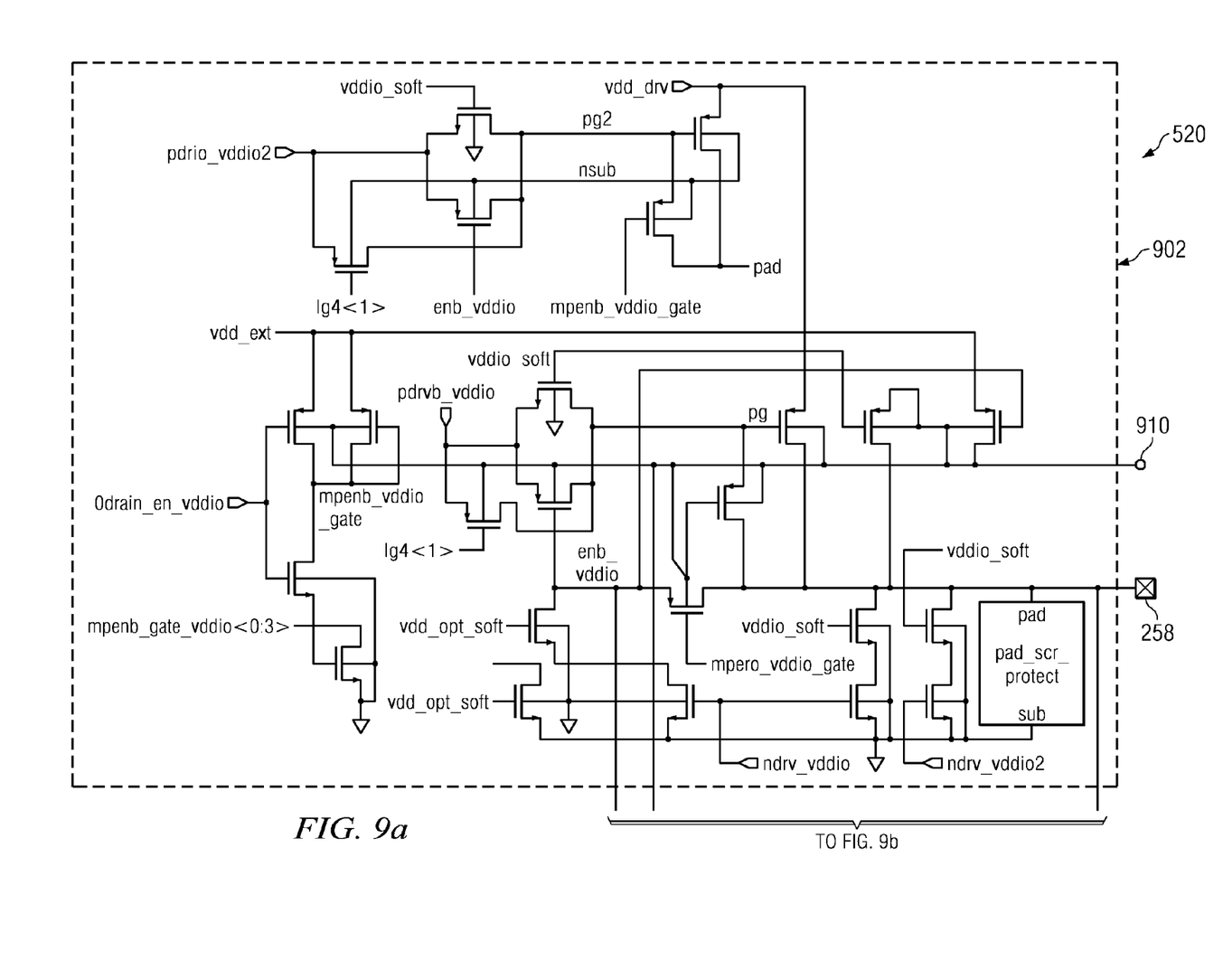
FIG. 9 is a schematic diagram of the pad driver logic.
Figure 9B:
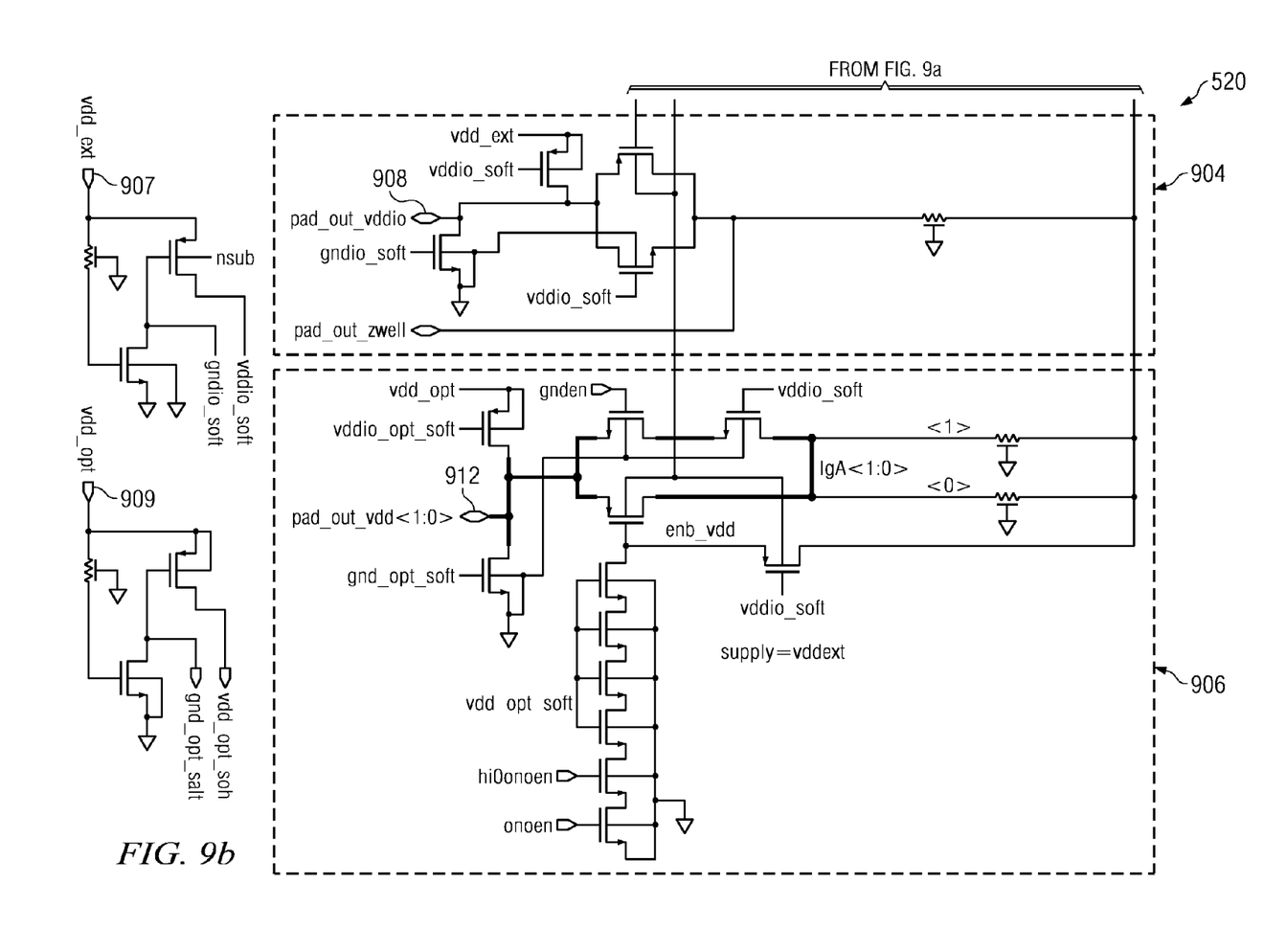

Referring now to FIG. 9, there is provided a schematic diagram of the pad driver logic 526 associated with a particular GPIO pin 258. Transceiver circuitry 902 is indicated generally at 902. The transceiver circuitry 902 processes data transmitted on the GPIO pin 258. The receiver circuitry 904 is illustrated generally at 904. The receiver circuitry processes the received data signal on the GPIO pin 258. The pad driver logic is illustrated generally at 906. The information transmitted using the transmitter circuitry 902 is output at node 258 comprising the GPIO pad. The data being received by the receiver 904 also comes in on the GPIO pad 904 through the receive circuitry 904 and the output data provided at node 908. The bias voltage for the transmitter circuitry 902 is provided from node 910.

The pad driver circuitry 906 receives the LCD driver voltage at node 912. The $V_{DD}/V_{LCD}$ voltage from the gate logic is applied to the receiver circuitry and the pad driver logic 906 at the vdd_ext node 907 and vdd_opt node 909. Similar to the discussions with respect to FIGS. 5-8, when an LCD driver voltage is being provided through the pad driver circuitry 906 the bias voltage is applied to the circuitry or such that the bias voltage is equal to or greater than the applied LCD driver voltage.

Figure 10:
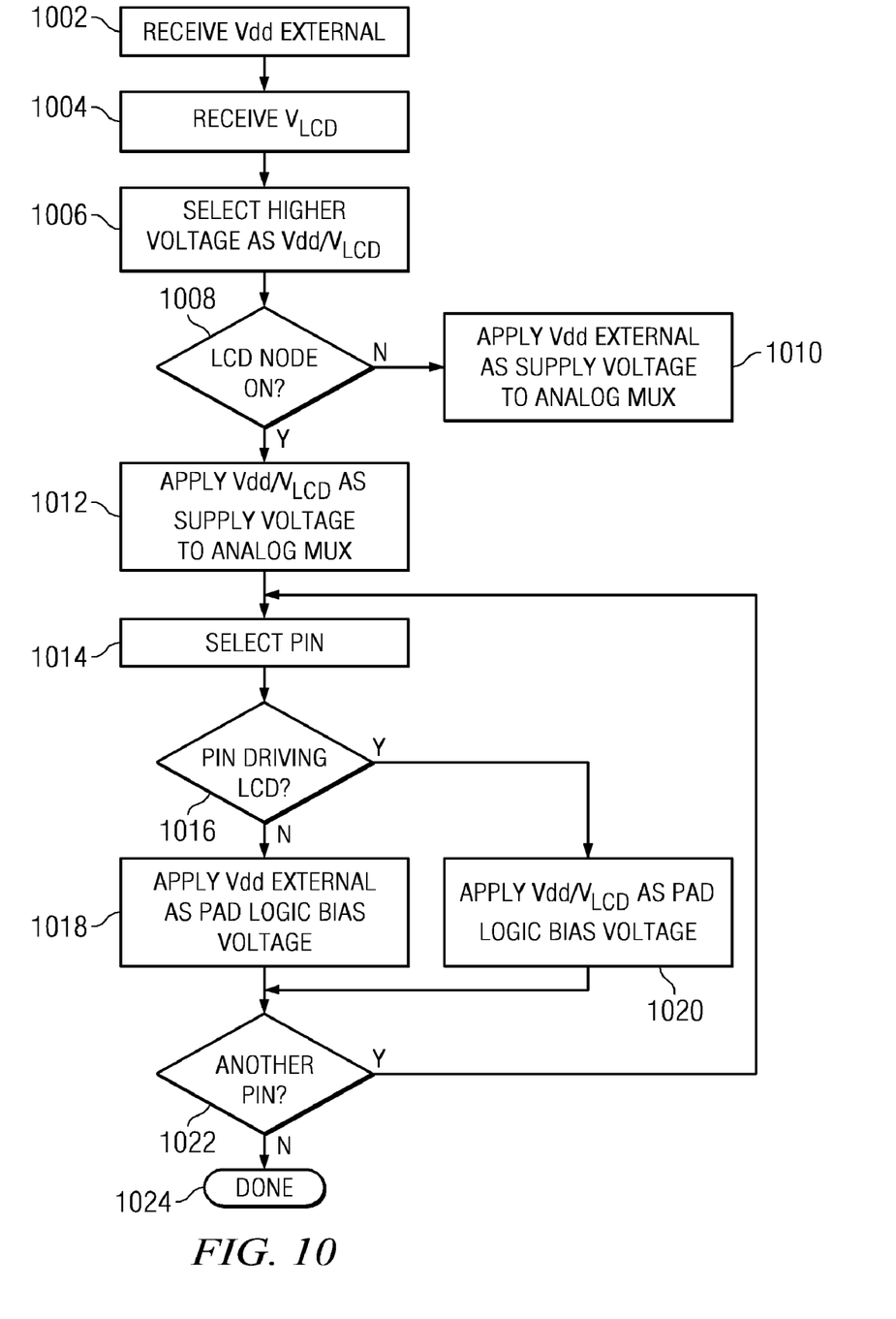
FIG. 10 is a flow diagram describing the operation of the GPIO pad logic described with respect to FIGS. 5-9.

Referring now to FIG. 10, there is illustrated a flow diagram describing the operation of the circuitry described with respect to FIGS. 5-9 for ensuring that the bias voltage applied to the analog multiplexer and the pad driver circuitry are high enough to prevent an LCD drive voltage rising above the bias voltage levels from causing errors within the operation of the LCD controller. The VDD_EXTERNAL voltage signal is received at step 1002. Likewise, the LCD driver voltage $V_{LCD}$ is received at step 1004. The higher of the voltages between the VDD_EXTERNAL voltage and the $V_{LCD}$ voltage is selected as the $V_{DD}/V_{LCD}$ voltage which may be applied when a determination is made that the controller is operating in an LCD mode. Next, at inquiry step 1008 a determination is made if the global LCD mode is operating with respect to the LCD controller. This means that at least some of the GPIO pins 258 are being used to drive an LCD. If not, control passes to step 1010 and the VDD_EXTERNAL voltage is applied as the supply voltage to the analog multiplexer.

If inquiry step 1008 determines that the global LCD mode is on, control passes to step 1012 wherein the $V_{DD}/V_{LCD}$ voltage is provided as the supply voltage to the analog multiplexer. Since the higher of $V_{DD}$ or $V_{LCD}$ was selected as the voltage $V_{DD}/V_{LCD}$ this will ensure that the bias voltage of the analog multiplexer is always higher than or equal to the $V_{LCD}$ drive voltage being applied through the analog multiplexer.

Next, at step 1014, one of the GPIO pins of the LCD controller is selected at step 1014 for examination. Inquiry step 1016 determines whether the selected pin is being used for driving an LCD responsive to the LCD_SELECT signal. If not, control passes to step 1018 and the VDD_EXTERNAL voltage is applied as the pad logic bias voltage. If inquiry step 1016 determines that the pin will be driving an LCD, the $V_{DD}/V_{LCD}$ voltage is selected as the pad logic bias voltage at step 1020. Inquiry step 1022 determines if additional GPIO pins 1058 exist upon the LCD controller and if so, a next pin is selected at step 1014. When no further pins exist for a determination of use as an LCD driver control passes to step 1024 and the process is completed.

Using the above described system and method, the bias voltages applied to the analog multiplexer and pad driver logic of an LCD controller output may always be set at a level that will ensure that the bias voltage is higher than the LCD drive voltages being placed through the output pin. This will prevent undesired glitches and errors within the operation of the pad output logic circuitry.

It will be appreciated by those skilled in the art having the benefit of this disclosure that this system and method for providing bias voltages to pad logic of LCD controller to ensure the bias voltage is always greater than or equal to an applied drive voltage. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An LCD controller, comprising:
   at least one I/O pad for providing an LCD drive voltage in an LCD mode of operation for the I/O pad;
   I/O pad drive logic for driving the at least one I/O pad responsive to a provided bias voltage;
   voltage selection logic for providing a higher of the LCD drive voltage and a system voltage as a first voltage;
   bias voltage logic for providing one of the system voltage or the first voltage as the bias voltage for the for the I/O pad logic, wherein the system voltage is provided as the bias voltage for the I/O pad logic in a non-LCD mode of operation for the I/O pad and the first voltage is provided as the bias voltage for the I/O pad logic in the LCD mode of operation for the I/O pad.

2. The LCD controller of claim 1, wherein the I/O pad drive logic further comprises an analog multiplexer for selecting the LCD drive voltage from a plurality of input voltages from a charge pump responsive to the bias voltage.

3. The LCD controller of claim 2, wherein the bias voltage logic further provides one of the system voltage or the first voltage as the bias voltage for the analog multiplexer, wherein the system voltage is provided responsive to an indication that LCD controller is in a non-LCD mode of operation and the first voltage is provided responsive to an indication the LCD controller is in the LCD mode of operation.

4. The LCD controller of claim 1, wherein the bias voltage logic further comprises pad drive bias voltage selection logic associated with each of the at least one I/O pad drive logic for providing the system voltage or the first voltage as the bias voltage for the I/O pad drive logic associated with the pad drive bias voltage selection logic, wherein the system voltage is provided as the bias voltage for the associated I/O pad drive logic responsive to an indication the associated I/O pad drive logic is not driving a connected LCD and the first voltage is provided as the bias voltage for the associated I/O pad drive logic responsive to an indication the associated I/O pad drive logic is driving the connected LCD.

5. The LCD controller of claim 1, wherein the bias voltage logic ensure that the bias voltage applied to the I/O pad logic is always equal to or larger than the LCD drive voltage on the I/O pad.

6. The LCD controller of claim 1, wherein I/O pad drive logic associated with the at least one I/O pad comprises a Schmitt trigger circuit coupled to the respective at least one I/O pad.

7. The LCD controller of claim 6, wherein I/O pad drive logic associated with the at least one I/O pad comprises a receiver circuit coupled to the Schmitt trigger circuit for the respective at least one I/O pad, the receiver circuit further coupled to the respective at least one I/O pad.

8. The LCD controller of claim 1, wherein I/O pad drive logic associated with the at least one I/O pad comprises a pre-driver circuit coupled to the respective at least one I/O pad.

9. The LCD controller of claim 8, wherein I/O pad drive logic associated with the at least one I/O pad comprises a transceiver circuit coupled to the pre-driver circuit for the respective at least one I/O pad, the transceiver circuit further coupled to the respective at least one I/O pad.

10. The LCD controller of claim 1, wherein I/O pad drive logic associated with the at least one I/O pad comprises driver logic coupled to the analog multiplexer for the respective at least one I/O pad.

11. The LCD controller of claim 10, wherein the driver logic in the I/O pad drive logic associated with the at least one I/O pad is coupled to the respective at least one I/O pad.

12. An LCD controller, comprising:
    a plurality of I/O pads for providing an LCD drive voltage in an LCD mode of operation for the I/O pads;
    I/O pad drive logic associated with each of the plurality of I/O pads for driving the associated I/O pad responsive to a bias voltage;
    an analog multiplexer for selecting the LCD drive voltage from a plurality of input voltages from a charge pump responsive to the bias voltage;
    voltage selection logic for providing a higher of the LCD drive voltage and a system voltage as a first voltage;
    first bias voltage logic for providing one of the system voltage or the first voltage as the bias voltage for the analog multiplexer, wherein the system voltage is provided responsive to an indication that LCD controller is in a non-LCD mode of operation and the first voltage is provided responsive to an indication the LCD controller is in the LCD mode of operation; and
    second bias voltage logic associated with each of the plurality of I/O pads for providing the system voltage or the first voltage as the bias voltage for the associated I/O pad drive logic, wherein the system voltage is provided as the bias voltage for the associated I/O pad drive logic responsive to an indication the associated I/O pad is not driving a connected LCD and the first voltage is provided as the bias voltage for the associated I/O pad drive logic responsive to an indication the associated I/O pad is driving an LCD.

13. The LCD controller of claim 12, wherein the first and second bias voltage logic ensure that the bias voltage applied to the analog multiplexer and to the I/O pad logic is always equal to or larger than the LCD drive voltage on the I/O pad and on the analog multiplexer.

14. A method for selecting a bias voltage for I/O pad drive logic of an LCD controller, comprising the steps of:
    selecting a higher voltage between an LCD drive voltage and an externally provided system voltage;
    determining whether an I/O pad of the LCD controller is in an LCD mode of operation or a non-LCD mode of operation;
    selecting the externally provided system voltage as the bias voltage of the I/O pad drive logic if the I/O pad of the LCD controller is in the non-LCD mode of operation; and
    selecting the selected higher voltage as the bias voltage of the I/O pad drive logic if the I/O pad of the LCD controller is in the LCD mode of operation.

15. The method of claim 14, wherein the step of determining further includes the step of determining whether the LCD controller is in the LCD mode of operation or the non-LCD mode of operation.

16. The method of claim 15, further including the steps of:
    selecting the externally provided system voltage as a second bias voltage of an analog multiplexer if the LCD controller is in the non-LCD mode of operation; and
    selecting the selected higher voltage as the bias voltage of the analog multiplexer if the LCD controller is in the LCD mode of operation.

17. The method of claim 14, wherein the step of determining further includes the step of determining whether the I/O pad is driving an LCD.

18. The method of claim 14, wherein the step of determining further includes the step of determining whether each I/O pad of the LCD controller in the LCD mode of operation or the non-LCD mode of operation.

19. The method of claim 18 wherein the step of selecting the externally provided system voltage further comprises the step of selecting the externally provided system voltage as the bias voltage for each I/O pad of the LCD controller in the non-LCD mode of operation.

20. The method of claim 18, wherein the step of selecting the selected higher voltage further comprises the step of selecting the selected higher voltage as the bias voltage for each I/O pad of the LCD controller in the LCD mode of operation.

* * * * *